July 30, 1929.  G. S. ISKYAN  1,722,577
VALVE GRINDING TOOL
Filed May 11, 1928
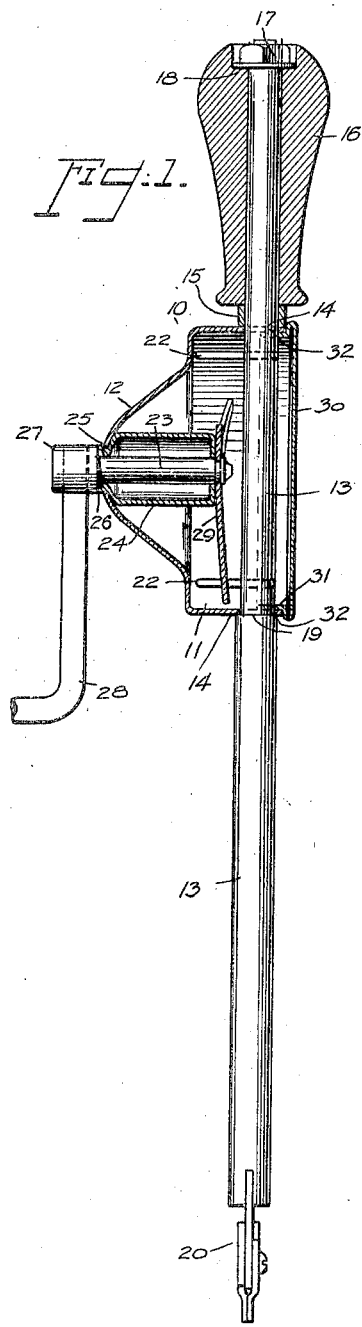
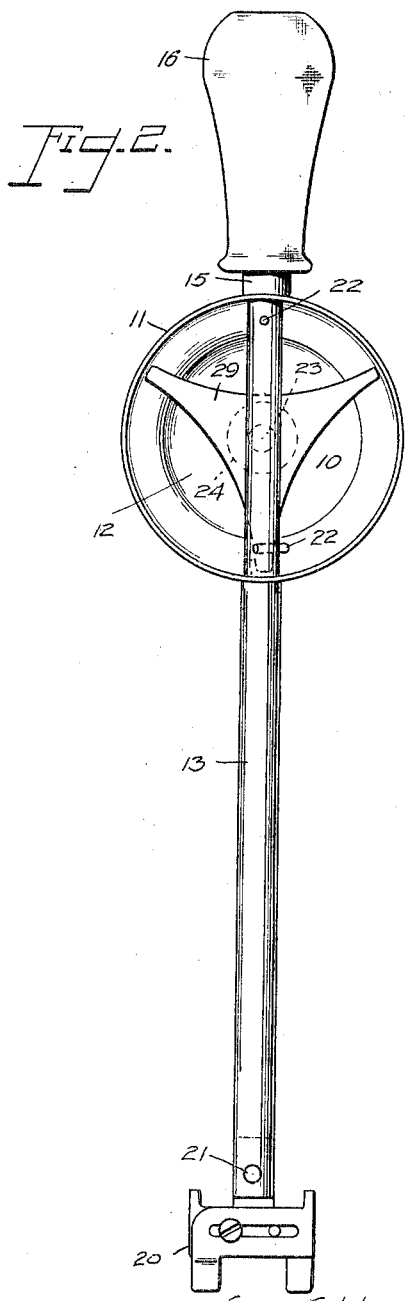
George S. Iskyan
INVENTOR
BY
ATTORNEY Patented July 30, 1929.

1,722,577

UNITED STATES PATENT OFFICE.

GEORGE S. ISKYAN, OF LONG ISLAND CITY, NEW YORK, ASSIGNOR TO G. M. CO. MANUFACTURING COMPANY, INC., OF LONG ISLAND CITY, NEW YORK, A CORPORATION OF NEW YORK.

VALVE-GRINDING TOOL.

Application filed May 11, 1928. Serial No. 276,837.

My invention relates to improvements in a valve grinding tool adapted especially for operation on the valves of internal combustion engines.

This invention has for its main object to provide a valve grinding tool of the character hereinafter described, which is simple in construction, inexpensive to manufacture and highly efficient in operation.

Briefly, the present invention comprehends a valve grinding tool operated to impart alternating angular movements of a valve in opposite directions in such manner that the movements of the valve will tend to properly grind the latter against its seat. A further object of my invention is to provide an improved mechanism for effecting such movements and I accomplish this object by means of the arrangement and combinations of parts hereinafter fully described in the specification, set forth in the appended claims and illustratively exemplified in the accompanying drawings, in which, Figure 1 is a substantially longitudinal sectional view of the invention; and Figure 2 is an elevational view of the same with a portion removed to disclose the mechanisms for imparting movements to the grinder.

Referring to the drawings, 10 denotes a metal housing comprising a cylindrical portion 11 and a dome shaped portion 12 closing one end thereof. An upright spindle 13 is rotatably mounted in openings 14 disposed in opposite sides of the wall of the cylindrical portion 11 of the housing. The upper end of the spindle 13 beyond the housing 10 is provided with a ferrule 15 disposed between the housing and a handle or grip member 16, which is rotatably mounted on the spindle 13 and which is held in position thereon by a nut and washer 17 adjustable over the threaded upper end of the spindle, the washer being seated against a shoulder 18 formed by a recess in the outer end of the handle. Below the housing 10, the spindle 13 is slightly increased in diameter to provide a shoulder 19, which is brought to bear against the wall of the cylindrical portion 11 by adjustment of the nut 17. The extreme lower or working end of the spindle 13 is forked to accommodate a bit 20 for engaging the valve to be ground, the bit 20 being preferably pivoted in the forked end of a pivot pin 21.

The portion of the spindle 13 within the cylindrical portion 11 of the housing is provided with a pair of spaced projecting pins 22, which operate close to the opposite inner sides of the cylindrical portion 11 and projects towards the dome like closed wall 12, and which are slightly offset with respect to each other along the longitudinal axis of the spindle, as shown in Figure 2.

A driving shaft 23 is journaled in a bearing 24 mounted in the closed end 12 of housing 10, said shaft 23 being disposed counter to the spindle 13 and on an axis which bisects the axis of the spindle 13 midway between the two pins 22. The bearing 24 comprises a tubular member through which the driving shaft 23 projects, the opposite ends of the tubular member being turned in to provide a bore or opening which will provide a running fit for spaced points on the shaft 23. The end of the bearing 24 adjacent the closed end 12 of the housing is provided with an annular groove 25 into which the wall of the opening in the closed end 12 is permanently secured. This construction provides a short collar 26 just outside of the dome end against which the hub 27 of a crank handle 28 revolves, the hub 27 being an integral part of the driving shaft 23.

The opposite end of the driving shaft 23 receives a star wheel 29 comprising a three armed blade slightly concave in the direction of the bearing 24. The star wheel 29 revolves within the cylindrical portion 11 of the housing between the spindle 13 and the said bearing 24 and the tip portions of the arms move through a path intercepted by the pins 22. The star wheel is held in position by turning over the end of the driving shaft 23, as illustrated in Figure 1.

The open end of the housing 10 is closed by a cover piece 30 comprising a disc like face and projecting skirt like run 31, which is adapted to fit within the wall of of the cylindrical portion 11 and which is provided with cut outs 32 to accommodate the wall of the spindle 13 which is disposed closely adjacent the open end of the housing.

In the operation of this device, the bit 20 is placed in engagement with the valve and the tool is held in upright position by gripping the handle 16 in one hand and manipulating the crank handle 28 with the other. Rotary movement of the star wheel 29 with the driving shaft 23 brings the tip of one arm first against one side of the upper pin 22 causing it to move to the side in the direction of rotation of the crank handle, and then as the same arm moves to complete the lower half of its cycle it engages the lower pin 22, which has been turned to the side, and reverses the movement of the spindle by moving the lower pin 22 in the direction of rotation of the handle. When the pins 22 have revolved with the spindle 13 to a certain point on each side of the axis thereof the arms simply slide past the pins. It is pointed out, that due to the curvature of the wall of the cylindrical portion 11 on opposite sides of the spindle 13 and the position of the pins 22 therein with respect to said wall the pins 22 contact with the inner face of the wall if the spindle 13 has any tendency to turn further in either direction than that caused by the movement of the star wheel. This condition will prevent the pins 22 from being accidentally moved to a position which would bring them out of the path of the arms of the star wheel 29. Continuous rotation of the crank handle 28 will repeat the operation just described and a rapid oscillating movement of the valve upon its seat will result, whereby the valve and the valve seat will be ground.

Having described my invention what I claim and desire to secure by Letters Patent is:

1. A valve grinding tool, comprising an upright spindle for turning the valve, a driving shaft disposed at an angle to the spindle, means operated by the shaft for imparting oscillatory movement to the spindle, a housing supported on the spindle and enclosing said means and a bearing member mounted in said housing and supporting the shaft adjacent its opposite ends.

2. A valve grinding tool, as claimed in claim 1, in which the housing comprises a cylindrical portion having a dome shaped closed end and a cover for the open end, and the bearing comprises a tubular member disposed about the shaft and contracted at opposite ends to form a bearing for both ends of said shaft.

In testimony whereof I affix my signature.

GEORGE S. ISKYAN.